Inventors
John G. Howard
Frank J. Veselsky

United States Patent Office 2,723,867
Patented Nov. 15, 1955

2,723,867

CARTRIDGE-TYPE TURBINE PACKING

John G. Howard, Chicago, and Frank J. Veselsky, North Riverside, Ill., assignors to The Pyle-National Company, Chicago, Ill., a corporation of New Jersey Application March 17, 1952, Serial No. 276,914

1 Claim. (Cl. 286—8)

This invention relates generally to high pressure packing and more particularly to a cartridge-type packing unit which may be removed or assembled as a unit on the turbine wheel shaft of a steam turbine or the like.

According to the general principles of the present invention, a packing unit is provided comprising ring plate means which are clamped in firm assembly. The ring plate means form a passageway bounded by a plurality of longitudinally spaced annular recesses extending radially outwardly of the passageway. A bushing is inserted into the passageway and is provided with a flange extending into the endmost annular recess. The bushing is provided with an external bearing surface. A packing ring is located in each of the other annular recesses, each of the packing rings preferably comprising a plurality of arcuate segments held together by means of a garter spring which urges the segments radially inwardly into bearing contact with the bearing surface of the bushing. The bushing, together with the packing rings and the ring plate means, form a unitary cartridge unit which may be removed or assembled very readily on the turbine wheel shaft of a steam turbine or the like.

It is an object of the present invention to provide an improved packing unit for a turbine installation.

Another object of the present invention is to provide a cartridge-type turbine packing which may be removed or assembled as a unit in a turbine installation.

Another object of the present invention is to provide an improved packing unit which may be conveniently fabricated from a reduced number of simplified elements.

Many other features, advantages and additional objects of the present invention will become manifest to those versed in the art upon making reference to the detailed description which follows and the accompanying sheets of drawings which form a part of this specification.

Figure 1:
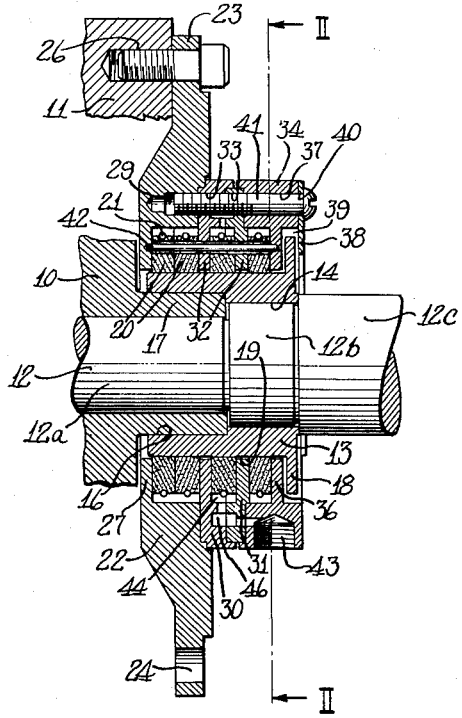
Figure 2:
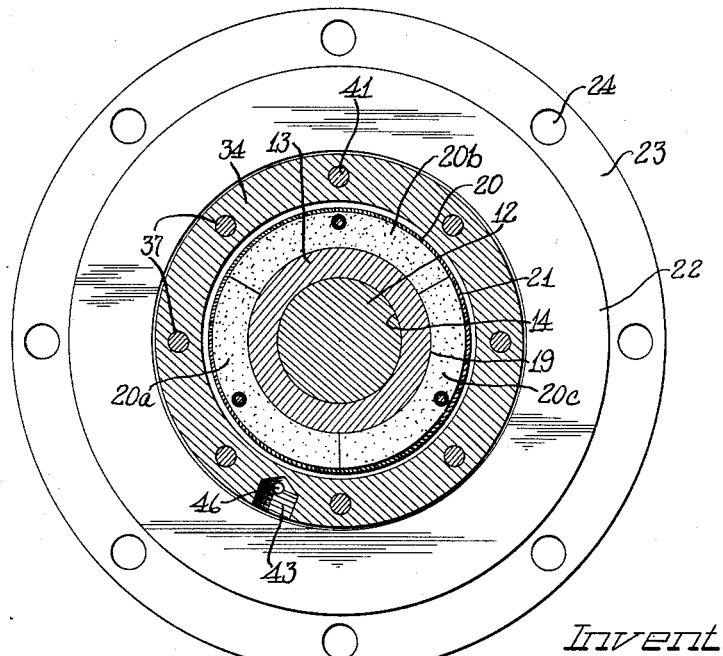

On the drawings:

Figure 1 is a cross-sectional view with parts broken away and with parts removed for the sake of clarity and also with parts shown in elevation illustrating a packing unit provided in accordance with the principles of the present invention; and Figure 2 is a cross-sectional view with parts shown in elevation taken substantially on line II—II of Figure 1.

As shown on the drawings:

Although the packing unit of the present invention is of general utility, it finds a particularly advantageous use in connection with a steam turbine installation. In the drawings, a turbine wheel is shown at 10 and a fragmentary portion of a turbine casing is shown at 11, the shaft for the turbine wheel 10 being indicated at 12.

In accordance with the sealing arrangement of the present invention, the turbine shaft 12 is stepped to provide at least three separate stepped portions 12a, 12b and 12c of progressively increased diameter. The smallest diameter portion 12a carries the turbine wheel 10. The largest diameter portion 12c forms a shoulder against which a bushing 13 abuts, the bushing 13 being provided with a passage 14 receiving in press fit relationship the stepped portion 12b of the shaft 12 so that the bushing 13 is corotatable with the shaft 12.

The passage 14 in the bushing 13 is counterbored as at 16 thereby to provide an annular recess surrounding the reduced diameter portion 12a of the shaft 12 and receiving a hub portion 17 formed on the turbine wheel 10.

At one end of the bushing 13 is provided a flange 18 which extends radially outwardly an appreciable distance. Adjacent the flange 18 is provided an external bearing surface 19.

A plurality of longitudinally aligned packing rings 20 made out of a suitable bearing material such as carbon or the like are spaced along the length of the bearing surface 19 on the bushing 13. Each of the packing rings 20 comprises a plurality of arcuate segments which are clamped by a garter spring 21 surrounding the packing ring 20 and urging the segments radially inwardly into bearing contact with the bushing 13. In the preferred embodiment shown, each of the packing rings 20 comprises three segments 20a, 20b and 20c having an arcuate dimension of 120°. The arcuate segments 20a, 20b and 20c are provided with a peripheral groove seating the garter spring 21.

Adjacent the turbine wheel is provided a first ring plate 22 which is flanged as at 23 and apertured as at 24 so that the ring plate 22 may be attached in firm assembly to the turbine casing 11. It will be understood that the turbine casing 11 will be provided with a plurality of threaded apertures 26 so that the usual fastening bolts may be employed to connect the ring plate 22 to the turbine housing 11.

The ring plate 22 is provided with a flange 27 which extends radially inwardly and which is of smaller bore diameter than the outer diameter of packing rings 20 so as to provide a substantial abutment shoulder therefor.

It will be further noted that the ring plate 22 is provided with an annular row of circumferentially spaced threaded apertures 29 which are provided for a purpose to be explained hereinafter.

A second ring plate 30 and a third ring plate 31 are provided each having a flange 32 extending radially inwardly and being of smaller bore diameter than the outer diameter of packing rings 20 so as to afford a wafer-like interleaved assembly of the ring plates 22, 30 and 31 and the packing rings 20. The ring plates 30 and 31 are each provided with an annular row of circumferentially spaced apertures 33 adapted to lie in registry with the apertures 29 formed in the ring plate 22.

A fourth ring plate 34 having a flange 36 extending radially inwardly and being of smaller bore diameter than the outer diameter of flange 18 on the bushing 13 and of smaller bore diameter than the outer diameter of packing rings 20 abuts against the third ring plate 31. The fourth ring plate 34 is also provided with an annular row of circumferentially spaced apertures 37.

A sleeve retaining plate 38 generally arcuate in configuration provides a radially inwardly extending flange which is of smaller bore diameter than the outer diameter of flange 18 on the bushing 13 and together with the flange 36 on the fourth ring plate 34 forms a recess 39 which receives the flange 18. The retainer plate 38 is also provided with circumferentially spaced apertures 40. A plurality of threaded bolts 41 are extended through the apertures 40, 37, 33 and into the threaded apertures 29 so as to clamp all of the ring plates into unitary assembly. Since the recess 39 confines the flange 18 of the bushing 13, it will be understood that the bushing 13 also forms a part of the unitary assembly effected by the ring plates and the packing rings 20 are also thus confined in the annular recesses formed by the ring plates and the bushing.

In order to prevent the packing rings 20 from rotating, each of the packing ring segments 20a, 20b and 20c is suitably apertured to receive a pin 42. The first ring plate 22 and the fourth ring plate 34 are suitably provided with appropriate recesses to seat opposite ends of the pins 42. It will be understood that since the primary function of the pins 42 is to confine the movement and prevent rotation of the packing rings 20, sufficient clearances are provided by the apertures in the segments 20a, 20b, and 20c to permit a radially inward adjustment by garter springs 21 of the packing rings segments without interference by pins 42.

Because of the unitary assembly thus described, a packing cartridge is provided which can be removed or assembled as a unit in a turbine apparatus.

It will be noted that the fourth ring plate 34 is provided with a threaded aperture 43 communicating with an annular recess 44 in a medial portion of the packing seal by means of a passageway 46. A water seal may be provided at such point or the aperture 43 may be connected by suitable means acting as a drain, for example, to atmosphere. It is also possible, of course, to connect the aperture 43 to a suitable source of pressure such as an auxiliary steam line so as to provide a positive pressure seal under certain environmental conditions of use.

Although various minor structural modifications might be suggested by those versed in the art, it will be understood that we wish to embody within the scope of the patent warranted hereon all such modifications as reasonably and properly come within the scope of our contribution to the art.

We claim as our invention:

A high pressure cartridge-type packing assembly for a turbine comprising, a mounting member having an outer flange forming connecting means for mounting the packing in stationary assembly with the casing of a turbine, said mounting member having a radially inwardly extending flange forming a ring plate, said mounting member having an annular row of circumferentially spaced apertures formed therein, a plurality of ring plate members having radially inwardly extending flanges disposed in axially spaced relation to one another to provide a longitudinal row of annular spaced apart recesses, a retaining plate means having fasteners extending axially into said apertures of said mounting member and clamping said ring plate members between said retaining plate means and said mounting member and in assembly therewith, a bushing having a counterbored passage therethrough forming at least two stepped portions of progressively increased diameter and having a peripheral bearing surface generally concentric of said passage and being spaced radially inwardly of said flanges on said ring plate members, said bushing adapted to have a turbine shaft co-rotatably connected to one of said stepped portions and to have the hub of a turbine wheel received in another of said stepped portions, a flange at one end of said bushing extending radially outwardly of said bearing surface overlying one of said ring plate members, packing rings in said recesses each comprising a plurality of arcuate segments having inner peripheral surfaces engaging said bushing at said bearing surface, a garter spring surrounding the segments in each recess and clamping the segments radially inwardly into bearing contact with said bearing surface, and means between said packing rings and said ring plate members to prevent rotation therebetween.

References Cited in the file of this patent

UNITED STATES PATENTS

| | | |
|---|---|---|
| 670,565 | Reynolds | Mar. 26, 1901 |
| 872,366 | Ver Planck | Dec. 3, 1907 |
| 976,369 | Huhn | Nov. 22, 1910 |
| 1,377,143 | Wait | May 3, 1921 |
| 1,580,603 | Jabs | Apr. 13, 1926 |
| 1,613,924 | Boltshauser | Jan. 11, 1927 |
| 1,689,874 | Jabs | Oct. 30, 1928 |
| 2,165,845 | France | July 11, 1939 |
| 2,439,917 | Anderson | Apr. 20, 1948 |

FOREIGN PATENTS

| | | |
|---|---|---|
| 93,448 | Sweden | Nov. 25, 1938 |
| 108,706 | Great Britain | Aug. 13, 1917 |